United States Patent [19]

Kuhn et al.

[11] 4,221,353

[45] Sep. 9, 1980

[54] VEHICLE AND BOOM ASSEMBLY

[75] Inventors: Patrick Kuhn; Donald K. Schmidt, both of Bismarck, N. Dak.

[73] Assignee: Clark Equipment Company, Buchanan, Mich.

[21] Appl. No.: 930,952

[22] Filed: Aug. 4, 1978

[51] Int. Cl.² ............................................. A47F 5/00
[52] U.S. Cl. ................................ 248/292.1; 239/166; 248/564
[58] Field of Search ........................... 212/8 R, 59 A; 248/292.1, 562, 564, 567, 573; 239/166, 167

[56] References Cited
U.S. PATENT DOCUMENTS

| 3,395,503 | 8/1968 | Greenburg et al. | 239/166 X |
| 3,554,478 | 1/1971 | Sunderman | 239/167 X |

Primary Examiner—Robert G. Sheridan
Attorney, Agent, or Firm—Harry G. Thibault

[57] ABSTRACT

A boom assembly mountable on a vehicle is provided in which the boom is supported at a lower or working position by a first spring. A manually applied force selectively applies a moment to partially rotate a toggle device and to partially lift the boom to an upper or clearance position. The partial rotation of the toggle device activates a second spring and the boom is raised to a second position by the combined force of the manually applied force and the force of the second spring.

19 Claims, 6 Drawing Figures

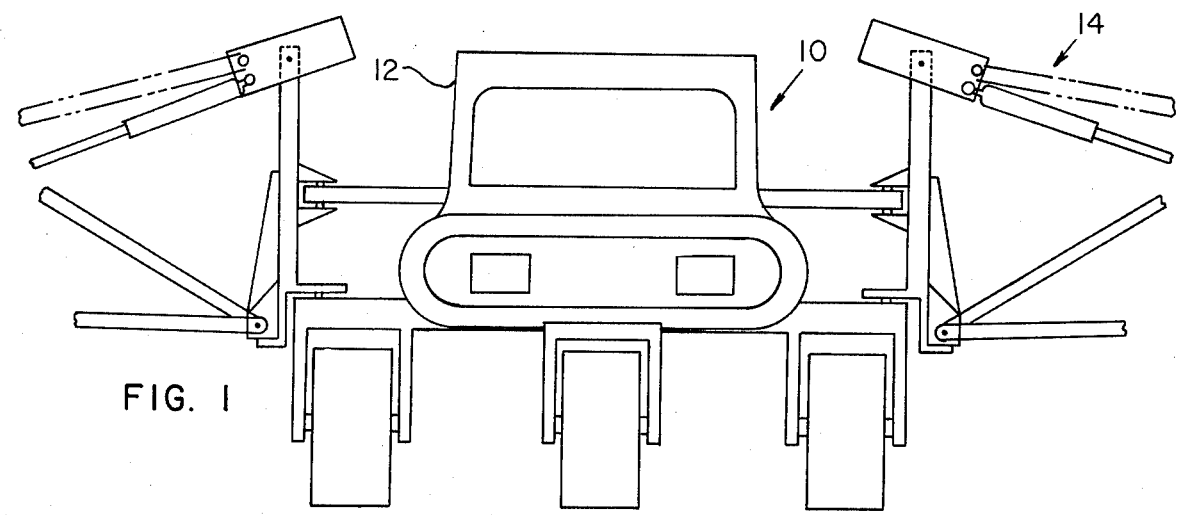
FIG. 1
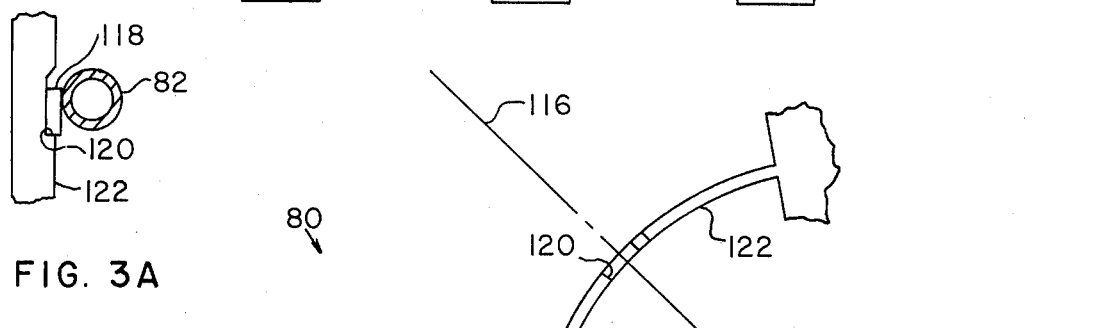
FIG. 3A
FIG. 3
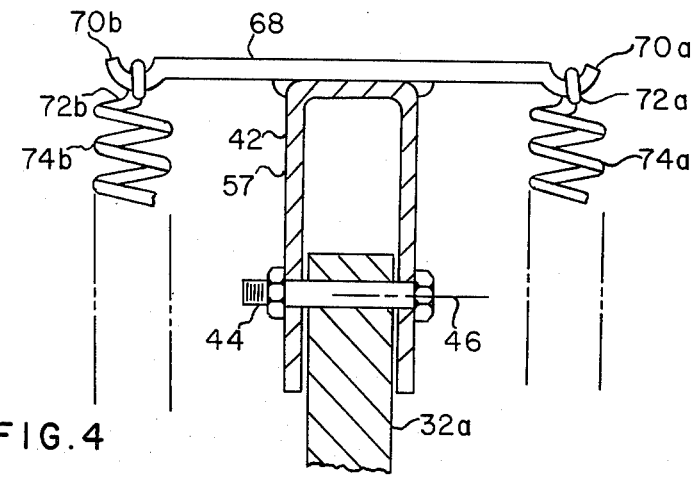
FIG. 4

VEHICLE AND BOOM ASSEMBLY

BACKGROUND OF THE INVENTION

1. Field of the Invention

This invention relates generally to vehicle and boom assemblies, and more particularly to a mechanism for resiliently supporting and for lifting the boom of agricultural spray vehicles, and the like. In the case of an agricultural spray vehicle, insecticides, herbicides, and fertilizers are sprayed onto the crop with the boom in a lower or working position, and an upper or clearance position is used to clear fences when making turns proximal thereto.

2. Description of the Prior Art

The prior art has included spray vehicles of the type in which the boom is raised entirely by a mechanical force which is developed manually; and the prior art has included the raising of the boom by hydraulic power.

SUMMARY OF THE INVENTION

In accordance with the broader aspects of this invention, there is provided a boom assembly mountable vehicle which includes a boom having inner and outer ends, being pivotally connected to the vehicle about an axis near the inner end, and being movable between upper and lower positions.

A toggle device is attachable to the vehicle for rotation about a second pivot axis that is substantially planar and parallel to the first axis. The toggle device is rotatable in a first direction to a first position and is rotatable in a second direction to a second position.

A first tension spring is connected to the boom intermediate of the ends thereof and to the toggle device at a point distal from the second axis and at a point wherein the weight of the boom causes a first moment on the toggle device that urges the toggle device toward the first position, and wherein the first point moves away from the spring when the toggle device is rotated to the second position. The spring has a length and load gradient wherein the boom is supported at the lower position when the toggle device is in the first position and wherein the boom is raised to the upper position when the toggle device is rotated to the second position.

A second tension spring is connected to the vehicle and is connected to the toggle device distal from the second axis and at a point wherein the second tension spring causes a second moment that urges the toggle device toward the second position when the toggle device is intermediate of the first and second positions.

The first moment that is developed by the boom and the weight thereof is larger than the second moment at all positions of the toggle device intermediate of the first and second positions so that the toggle device is urged toward the first position by the weight of the boom.

The vehicle and boom assembly further includes a mechanical linkage having a lever for manually and selectively applying a third moment to the toggle device in the direction that moves the toggle device from the first position toward the second position. Selective application of this third moment is effective to move the toggle device from the first position to a position intermediate of the first and second positions wherein the third moment that is developed by the second spring cooperates with the manually applied moment to move the toggle device to the second position and to raise the boom to the upper position.

The first spring provides resilient support for the boom so that the sudden application of gravity loads to the boom does not cause large stresses in the boom supporting mechanism; and a shock absorber is connected in parallel with the first spring to dampen both initial movements of the boom and continued oscillations thereof.

The present invention includes the advantages of decreasing shock loading stresses in the mechanism that supports the boom, damping both initial excursions and continuing oscillations of the boom that are caused by vertical or roll accelerations of the vehicle traveling over rough ground, simplicity of design and maintenance as opposed to a hydraulic lifting mechanism for the boom, and lower mechanical actuating forces for raising the boom than for conventional mechanical lifting linkages.

The abovementioned advantages and other features and advantages of this invention and the manner of obtaining them will become more apparent and the invention itself will be best understood by reference to the following description for an embodiment of the invention taken in conjunction with the accompanying drawings.

BRIEF DESCRIPTION OF THE DRAWINGS

FIG. 1 is a partial front elevation of the vehicle and boom assemblies of the present invention;

FIG. 3 is a side elevation of the manually actuated lever and cable attachment details for actuation of the boom of FIG. 2;

FIG. 3A is a partial and rotated view of the mechanism of FIG. 3 taken substantially as shown by view line 3A—3A but with the lever rotated to the latch notch of the upper boom position; and FIG. 4 is a partial cross-section of the mechanism of FIG. 2, taken substantially as shown by section line 4—4 of FIG. 2.

PREFERRED EMBODIMENT

Figure 2A:
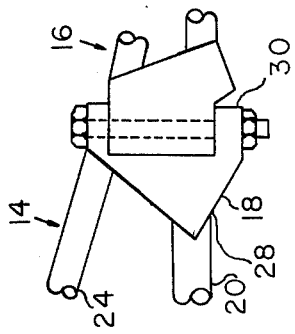
FIG. 2A is a portion of the boom of FIG. 2, broken off and moved leftwardly to show the hinge and a portion of the outer boom.
Figure 2:
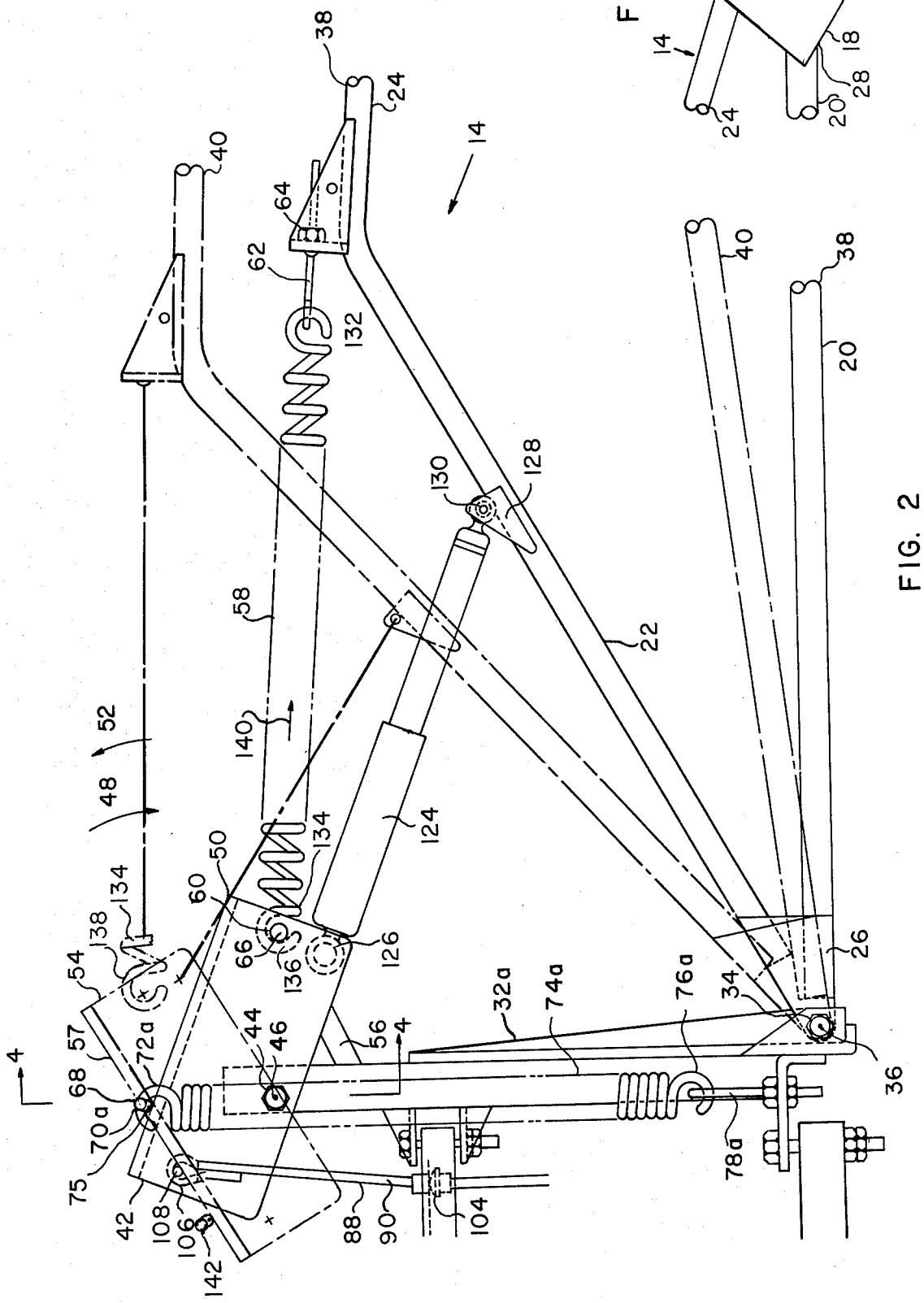
FIG. 2 is an enlarged and partial side elevation of one boom of the present invention showing the mounting, supporting, and lifting mechanism.

Referring now to FIGS. 1, 2, and 2A, a vehicle and boom assembly 10 includes a vehicle 12, an inner boom 14 which is attached to the vehicle 12, and an outer boom 16 which is attached to the inner boom 14 by a hinge assembly 18. In the discussion of the present invention, only those portions of the vehicle and boom assembly 10 which include the vehicle 12, the inner boom 14, and the details for supporting and raising the inner boom 14 will be described in detail.

The inner boom 14 is generally of a triangular construction as shown in FIGS. 2 and 2A; and this triangular construction includes a lower arm 20, an inner arm 22, and an outer arm 24. The lower arm 20 and the inner arm 22 are joined proximal to an inner end 26 of the inner boom 14; and the lower arm 20 and the outer arm 24 are joined by an inner half 28 of the hinge assembly 18.

The inner boom 14 includes the inner end 26 and an outer end 30. The inner end 26 is pivotally attached to a structural portion 32a of the vehicle 12 by means of a pivot bolt 34 that is disposed substantially in a horizontal plane, that permits the inner end 26 of the inner boom 14 to pivot around a pivot axis 36, and that permits the inner boom 14 to move between a lower or working position 38 and an upper or clearance position 40.

Referring now to FIGS. 2 and 4, the vehicle and boom assembly 10 further includes a toggle device 42 that is pivotally mounted to the structural portion 32a of the vehicle 12 by a pivot bolt 44 that pivots the toggle device 42 about a second pivot axis 46 that is substantially planar and parallel spaced apart from the pivot axis 36. The toggle device 42 is rotatable about the second pivot axis 46 and in first direction 48 to a first position 50 and in a second direction 52 to a second position 54. The toggle device 42 is prevented from rotating in the first direction 48 beyond the first position 50 by a stop plate 56 that is secured to the structural portion 32a. The toggle device 42 is in the form of a U-shaped plate 57, as best seen in FIG. 4, and so provides a clevis for the attaching of a first tension spring, or resilient supporting means, 58. The first spring 58 is attached to the toggle device 42 by a clevis pin 60; and the first spring 58 is attached to the inner boom 14 intermediate of the ends 26 and 30 by an eyebolt 62 and an attaching bracket 64. The clevis pin 60 is located at a first point 66 in the toggle device 42 which is distal from the second pivot axis 46 and which is substantially in line between the pivot axis 46 and the eyebolt 62 when the inner boom 14 is in the lower position 38 and the toggle device 42 is in the first position 50; so that, in the positions described, the weight of the inner boom 14 and the weight of the outer boom 16 do not apply a rotational moment to the toggle device 42 in either the first direction 48 or the second direction 52.

Referring again to FIGS. 2 and 4, the toggle device 42 includes a hook bar 68 that includes hooks 70a and 70b for securing of respective ones of spring ends 72a and 72b of second tension springs 74a and 74b. A spring end 76a of the spring 74a is connected to the structural portion 32a by an eyebolt 78a; and the spring 74b includes a spring end (not shown) that is connected (not shown) to the structural portion 32a in a manner similar to that of the spring end 76a.

Referring now to FIGS. 2 and 3, a mechanical linkage 80 is provided for selectively applying a moment to the toggle device 42 that is in the second direction 52, and that tends to urge the toggle device 42 from the first position 50 to the second position 54.

The mechanical linkage 80 includes both a manually actuated lever 82 and a tension linkage 84. The lever 82 is pivotally attached to a structural portion 32b by a pin 86. The tension linkage 84 includes a jacketed cable 88 having a flexible tension element 90 and a cable jacket 92.

A threaded end 94 of the flexible tension element 90 is secured to a clevis 96 and is adjusted thereto by a lock nut 98. The clevis 96 is pivotally attached to a bell crank 100 by a pin 102; and the bell crank 100 is welded to the lever 82. The jacket 92 is secured at one end thereof to the structural portion 32b by a cable clamp 103 as shown in FIG. 3 and is secured at the other end thereof to the structural portion 32a by a tension stop 104 as shown in FIG. 2. The flexible tension element 90 also includes a looped end 106 that is secured to the toggle device 42 by a pin 108.

With the manually actuated lever 82 in a position 110 as shown, a stop portion 112 of a handle 114 of the lever 82 engages a structural portion 32c to limit movement of the lever 82 downwardly. With the lever 82 in the position 110 as shown, the flexible tension element 90 is adjusted by means of the clevis 96 and the lock nut 98 to prevent the toggle device 42 from rotating in the first direction 48 beyond the first position 50. Optionally, rather than adjusting the length of the flexible tension element 90 as a stop for the rotational position of the toggle device 42 in the first direction 48, the stop plate 56 is provided.

Referring now to FIGS. 3 and 3A, when the lever 82 is actuated from the position 110 to a position 116, the flexible tension element 90 actuates the toggle device 42 to the second position 54, and a latch plate 118 which is welded to the lever 82 engages a latch notch 120 in a segment 122 thereby securing the lever 82 in the position 116 and thereby securing the toggle device 42 in the second position 54.

Referring now to FIG. 2, the vehicle and boom assembly 10 includes a hydraulic shock absorber 124 that serves as a damping means, that is attached to the toggle device 42 by a clevis pin 126, and that is attached to the inner boom 14 by a clevis plate 128 and a clevis pin 130.

Referring now to FIGS. 2-4, when the toggle device 42 is in the second position 54, the first spring 58 and the combined weight of the inner boom 14 and the outer boom 16 develop a moment on the toggle device 42 in the first direction 48 that is greater than the moment in the second direction 52 that is developed by the second springs 74a and 74b. Thus, whenever the lever 82 is moved to the position 110, tension in the flexible tension element 90 is relaxed and the greater moment in the first direction 48 rotates the toggle device 42 toward the first position 50 and the boom 14 moves toward the lower position 38.

As the toggle device 48 rotates toward the first position 50, the moment in the first direction 48, that is applied to the toggle device 42 by the spring 58 and the booms 14 and 16, decreases because the point 66 approaches being in a straight line with the axis 46 and the eyebolt 62; but also, the moment in the second direction 52 that is applied to the toggle device 42 by the springs 74a and 74b also decreases because an attaching point 75 of the hooks 70a and 70b approaches being in a straight line with the eyebolt 78a and the second pivot axis 46. Thus the moments in both directions decrease but the moment in the first direction 48 is greater at all points intermediate of the first position 50 and the second position 54 of the toggle device 42.

The second moment, as developed by the springs 74a and 74b, decreases and becomes zero slightly before the toggle device 42 reaches the first position 50; and, as the toggle device 42 reaches the first position 50, the springs 74a and 74b develop a small moment in the first direction 48 because the attaching point 75 of the hooks 70a and 70b goes slightly over center with respect to a line through the spring end 76a and the pivot axis 46.

When the lever 82 is actuated from the position 110 toward the position 116, the flexible tension element 90 applies a moment to the toggle device 42, the toggle device 42 is rotated from the first position 50 to a position intermediate of the first position 50 and the second position 54 wherein the inner boom 14 is raised from the lower position 38 to a position intermediate of the lower position 38 and the upper position 40, and wherein the attaching point 75 of the hooks 70a and 70b is moved away from substantial alignment with the second pivot axis 46 so that second springs 74a and 74b develop a moment in the second direction 52 which significantly assists the manually actuated moment of the flexible tension element 90 in raising the inner boom 14 from a position intermediate of the positions 38 and 40 to the upper position 40.

The overall result is that, when the inner boom 14 is in the lower position 38, the weight of the booms 14 and 16 acts directly through the spring 58 and the second pivot axis 46 without developing a moment on the toggle device 42; so that suddenly applied gravity loads to the booms 14 and 16 are resiliently resisted by the spring 58 and by the shock absorber 124 which operates in parallel with the spring 58. Then, when the lever 82 is actuated from the position 110 toward the position 116, the initial raising of the booms 14 and 16 is by the manual effort that is applied to the lever 82; but upon partial raising of the booms 14 and 16, the springs 74a and 74b assist to complete the raising of the inner boom 14 to the upper position 40.

Referring again to FIG. 2, it can be seen by inspection that initial movement in the second direction 52 from the first position 50 involves the application of only a small magnitude of force by the lever 82 of FIG. 3 and the flexible tension element 90 because the first point 66, whereto the spring 58 is attached to the toggle device 42, is in line with the eyebolt 62 and the second pivot axis 46. Therefore, even though the initial raising of the booms 14 and 16 from the lower position 38 is entirely by manually supplied force to the lever 82, the required manual actuating force is small; and, as soon as the attaching pin 60 moves away from alignment with the pivot bolt 44 so that a greater moment is required to rotate the toggle device 42 in the second direction 52, the attaching point 75 of the hooks 70a and 70b moves away from alignment with the second pivot axis 46 so that the springs 74a and 74b provide a third moment that assists in rotating the toggle device 42 in the second direction.

In like manner, as the toggle device 42 moves farther from the first position 50 toward the second position 54, the moment that is required to rotate the toggle device 42 increases; but, at the same time, the hooks 70a and 70b move farther from alignment with the pivot axis 46 so that the moment that is supplied by the springs 74a and 74b also increases. Thus, a very nominal force on the lever 82 is effective to raise the booms 14 and 16 from the lower position 38 to the upper position 40.

PRINCIPLES OF DESIGN AND OPERATION

The resilient means 58 has a first spring end 132 that is attached to the boom 14, a second spring end 134, and a first elastic load gradient between the ends 132 and 134. When the second end 134 is at a first position 136, the boom 14 is resiliently supported proximal to the lower position 38; and when the second end 134 is moved to a second position 138, the boom 14 is raised and resiliently supported proximal to the upper position 40.

A second resilient means, 74a and 74b, has a third end 72a that is operatively connected to the second end 134 of the first resilient means 58 by a toggle device 42, and has a fourth end 76a that is connected to a structural portion 32a of the vehicle 12 at a point wherein the elastic load gradient of the second resilient means, 74a and 74b, exerts a resilient force that resiliently urges the boom 14 toward the upper position 40.

A stop plate 56 cooperates with the toggle device 42 to limit movement of the second end 134 of the first resilient means 58 in a first direction 140 to the first position 136. Thus the stop plate 56 functions as a limiting means for limiting movement of the second end 134 in a first direction 140 to the first position 136.

A mechanical linkage 80, that includes a manually actuated lever 82 and a tension linkage 84, is operatively connected to the second spring end 134 of the first resilient means 58 by the toggle device 42; and the mechanical linkage 80 serves as a forcing means for selectively applying an actuating force to the second spring end 134 and for cooperating with the second resilient means, 74a and 74b, to selectively apply an actuating force or third force to move the boom 14 to the upper position 40 and to the lower position 38.

If the second resilient means, 74a and 74b, exerts a resilient force that is inadequate to raise the boom 14 without assistance from the lever 82, then the looped end 106 is attached to the toggle device 42 as shown to provide a moment in the second direction 52.

The toggle device 42 serves as a means for proportioning force and motion between the spring ends 72a and 134 as well as providing an operative connection between the spring ends 72a and 134. This proportioning provides one rate of mechanical advantage between the spring 58 and the toggle device 42 that varies as a function of the position of the toggle device 42 between the positions 50 and 54 and that increases the moment that the boom 14 exerts on the toggle device 42 as the toggle device 42 moves toward the second position 54. This proportioning also provides a second rate of mechanical advantage between the springs 74a and 74b and the toggle device 42 as a function of the position of the toggle device 42 between the positions 50 and 54 and decreases the moment that the springs 74a and 74b exert on the toggle device 42 in the second direction 52 as the toggle device 42 approaches the first position 50.

Preferably, the moment in the second direction 52, as developed by the springs 74a and 74b decreases to substantially zero or to a value wherein it is substantially ineffective in raising the boom 14 when the toggle device 42 is in the first position 50; and more preferably, the attaching point 75 of the hooks 70a and 70b goes over center with respect to the second pivot axis 46 when the toggle device 42 is in the first position 50 so that the springs 74a and 74b develop a small moment in the first direction 48.

Again, preferably, the moment in the second direction 52, as developed by the springs 74a and 74b is always algebraically and/or numerically unable or inadequate to raise the boom 14 without the assistance of the force that is selectively exerted by the mechanical linkage 80. That is, when the attaching point 75 goes over center, the springs 74a and 74b may develop a moment that is greater than the moment that is developed by the weight of the boom 14, but both moments are in the same direction so that the moment that is developed by the springs 74a and 74b is algebraically unable to raise the boom 14.

Movement of the hook 70a to a position 142, when the toggle device 42 is in the second position 54, decreases the tension load of the spring 74a as a function of the load gradient thereof; so that it would be expected that the mechanical linkage 80 would be required to apply a greater moment to the toggle device 42 as the toggle device 42 approaches the second position 54.

However, the moment arm or distance from the pivot axis 36 normal to the spring 58 increases as the toggle device 42 moves toward the second position 54, as can be seen in FIG. 2. Thus the mechanical advantage is increased by this increase in moment arm.

In addition, the attaching point 75 may be located at a larger radius from the pivot axis 46 than the point 66 is located from the pivot axis 46 so that the springs 74a and 74b have an increasing mechanical advantage to compensate for the aforementioned reduction in resilient force of the springs 74a and 74b. Therefore, by correctly locating the hooks 70a and 70b and the point 66, the toggle means 42 provides a proportioning means for compensating for the reduction in the resilient force of the springs 74a and 74b and maintains the required actuating force of the mechanical linkage 80 more constant than the resilient force of the springs 74a and 74b.

The resultant vehicle and boom assembly is inexpensive to manufacture, simple to maintain and repair, relatively free from service problems, and responds to reasonable levels of manual actuating forces.

While only a single embodiment of this invention is described in detail, it will be understood that the detailed description is intended to be illustrative only and that various modifications and changes may be made without departing from the spirit and scope of the present invention. Therefore the limits of the present invention should be determined from the attached claims.

What is claimed is:

1. A boom assembly mountable on a vehicle which comprises;
    a boom having inner and outer ends, the boom being pivotally connected to the vehicle about a first axis that is proximal to said inner end, and being movable between upper and lower positions;
    first resilient means, having first and second ends, having a first elastic load gradient between said first and second ends, and having said first end connected to said boom, for producing a force that is sufficient to resiliently support said boom proximal to said lower position when said second end is in a first position, and for raising said boom proximal to said upper position in response to movement of said second end to a second position;
    second resilient means, having third and fourth ends, having a second elastic load gradient between said ends, having said third end operatively connected to said second end of said first resilient means, and having said fourth end connected to said vehicle, for exerting a resilient force that resiliently urges said boom toward said upper position;
    limiting means, being connected to said vehicle, for limiting the movement of said second end in a first direction to said first position; and
    forcing means, being operatively connected to said second end of said first resilient means, for selectively applying an actuating force to said second end to move said second end to one of said positions thereof, and for cooperating with said second resilient means to selectively move said boom to either of said positions thereof.

2. A boom assembly mountable on a vehicle as claimed in claim 1 in which said boom has a weight that exerts a gravity force urging said second end of said first resilient means toward said first position and urging said boom toward said lower position that is greater than said resilient force urging said boom toward said upper position.

3. A boom assembly mountable on a vehicle as claimed in claim 2 in which said forcing means comprises a manually actuated lever and a flexible tension element.

4. A boom assembly mountable on a vehicle as claimed in claim 1 in which said assembly includes force and motion proportioning means for proportioning the movement of said third end of said second resilient means with respect to the movement of said boom and said second end of said first resilient means; and
    said force and motion proportioning means comprises said operative connection of said third end of said second resilient means to said second end of said first resilient means.

5. A boom assembly mountable on a vehicle as claimed in claim 4 in which said force and motion proportioning means comprises both proportioning of movement between said third end of said second resilient means and said proportioning means, and proportioning movement between said proportioning means and said second end of said first resilient means.

6. A boom assembly mountable on a vehicle as claimed in claim 4 in which said force and proportioning means renders said second resilient means substantially ineffective in transmitting said resilient force thereof to said second end of said first resilient means when said second end is proximal to said first position.

7. A boom assembly mountable on a vehicle as claimed in claim 4 in which said resilient force that resiliently urges said boom toward said upper position is reduced at said upper position as a function of said second elastic load gradient; and
    said force and motion proportioning means proportions said movements to compensate for said reduction in said resilient force to maintain said actuating force more constant than said resilient force.

8. A boom assembly mountable on a vehicle as claimed in claim 1 in which said assembly includes damping means, being connected to said boom and being operatively connected to said vehicle, for damping movement of said boom from one to the other of said positions thereof.

9. A boom assembly mountable on a vehicle which comprises;
    a boom having inner and outer ends, the boom being pivotally connected to the vehicle about a first axis that is proximal to said inner end, and being movable between upper and lower positions;
    a toggle device being rotatably attachable to said vehicle and being rotatable about a second axis that is substantially planar and parallel to said first axis, being rotatable in a first direction to a first position, and being rotatable in a second direction to a second position;
    a first tension spring having first and second spring ends, having said first spring end connected to said boom distal from said inner end, having said second spring end connected to said toggle device distal from said second axis and at a first point wherein the weight of said boom causes a first moment on said toggle device that urges said toggle device toward said first position wherein said boom is resiliently supported proximal to said lower position, and wherein said first point moves distal from said first spring end when said toggle device is rotated to said second position wherein said boom is raised proximal to said upper position;

a second tension spring having third and fourth spring ends, having said fourth spring end connected to said vehicle, and having said third spring end connected to said toggle device distal from said second axis and at a second point wherein said second tension spring causes a second moment that urges said toggle device toward said second position when said toggle device is intermediate of said positions thereof;

one of said moments is larger than the other of said moments when said toggle device is intermediate of said positions, whereby said toggle device is urged toward one of said positions; and said assembly further comprises forcing means for selectively applying a third moment to said toggle device that is in the direction of said other moment and that is greater than the difference between said larger and said other moments, whereby said toggle device is selectively moved to the other of said positions by said selectively applied third moment.

10. A boom assembly mountable on a vehicle as claimed in claim 9 in which said second point is located substantially in line with said second axis and said fourth end of said second tension spring when said toggle device is in said first position; whereby said second moment is substantially zero and said forcing means must supply a moment that is substantially equal to said first moment to move said toggle device away from said first position.

11. A boom assembly mountable on a vehicle as claimed in claim 9 in which said second point crosses a line between said second axis and said fourth end of said second tension spring as said toggle device approaches said first position; whereby said second moment decreases to zero and then increases in the direction that urges said toggle device toward said first position as said toggle device approaches said first position.

12. A boom assembly mountable on a vehicle as claimed in claim 9 in which said second moment is algebraically and numerically inadequate to resist said first moment, whereby said toggle device is rotated to said first position from said second position or from positions therebetween whenever said third moment is not applied.

13. A boom assembly mountable on a vehicle as claimed in claim 9 in which said assembly includes stop means, comprising a stop abutting said toggle device, for preventing said toggle device from rotating in said first direction beyond said first position.

14. A boom assembly mountable on a vehicle as claimed in claim 9 in which said forcing means comprises a manually actuated lever and a tension linkage.

15. A boom assembly mountable on a vehicle as claimed in claim 14 in which said forcing means includes a stop that prevents said toggle device from rotating in said first direction beyond said first position.

16. A boom assembly mountable on a vehicle as claimed in claim 14 in which said tension linkage comprises a flexible tension element.

17. A boom assembly mountable on a vehicle as claimed in claim 9 in which said assembly includes damping means, being connected to said boom and being operatively connected to said vehicle, for damping movement of said boom toward one of said positions.

18. A boom assembly mounted on a vehicle as claimed in claim 17 in which said damping means comprises a hydraulic shock absorber; and said operative connection of said damping means to said vehicle comprises connection of said shock absorber to said toggle device.

19. A boom assembly mountable on a vehicle as claimed in claim 9 in which said second point crosses a line between said second axis and said fourth end of said second tension spring as said toggle device approaches said first position, whereby said second moment decreases to zero and then increases in the direction that urges said toggle device toward said first position as said toggle device approaches said first position;

said second moment is algebraically and numerically inadequate to resist said first moment, whereby said toggle device is rotated to said first position from said second position or from positions therebetween whenever said third force is not applied;

said assembly includes stop means, for preventing said toggle device from rotating in said first direction beyond said first position;

said assembly includes a hydraulic shock absorber being connected to said boom and to said toggle device; and said forcing means comprises a hand lever and a tension linkage.

* * * * *

UNITED STATES PATENT OFFICE
CERTIFICATE OF CORRECTION

PATENT NO. : 4,221,353
DATED : September 9, 1980
INVENTOR(S) : Patrick Kuhn and Donald K. Schmidt It is certified that error appears in the above-identified patent and that said Letters Patent are hereby corrected as shown below:

IN THE TITLE

Please change the title to --Boom Assembly Mountable on a Vehicle--.

Signed and Sealed this

Twenty-eighth Day of April 1981

[SEAL]

Attest:

RENE D. TEGTMEYER

Attesting Officer     Acting Commissioner of Patents and Trademarks